United States Patent [19]

He et al.

[11] Patent Number: 5,032,259
[45] Date of Patent: Jul. 16, 1991

[54] FRICTION-REDUCING LUBRICATING-OIL FILTER FOR INTERNAL COMBUSTION ENGINE

[76] Inventors: Qi-sheng He; Chun-Guang Dong, both of Xingan Road 38#, Qingdao, China, 266012

[21] Appl. No.: 453,427

[22] Filed: Dec. 19, 1989

[30] Foreign Application Priority Data

Dec. 24, 1988 [CN] China ................ 88108950.8
Jan. 10, 1989 [CN] China ................ 89210721.9

[51] Int. Cl.$^5$ .................. B01D 35/00; F01M 1/00
[52] U.S. Cl. .................. 210/133; 210/199; 210/206; 210/209; 210/435; 184/6.21; 184/6.24; 123/196 R; 123/196 A
[58] Field of Search ............ 210/168, 199, 203, 206, 210/209, 416.5, 133, 435; 123/196 A, 196 R; 184/6.21, 6.24; 252/10

[56] References Cited

U.S. PATENT DOCUMENTS

| B 449,988 | 3/1976 | Lewis | 210/206 |
| 2,216,106 | 10/1940 | Balkwill | 123/196 |
| 2,769,621 | 11/1956 | Nakken | 259/7 |
| 2,898,902 | 8/1959 | Vogel | 123/196 |
| 4,061,572 | 12/1977 | Cohen et al. | 210/206 |
| 4,075,098 | 2/1978 | Paul et al. | 210/206 |
| 4,265,748 | 5/1981 | Villani et al. | 210/206 |

FOREIGN PATENT DOCUMENTS 0140278 5/1987 European Pat. Off. .

Primary Examiner—Robert A. Dawson
Assistant Examiner—Matthew O. Savage
Attorney, Agent, or Firm—Townsend and Townsend

[57] ABSTRACT

A friction-reducing lubricating-oil filter for Internal Combustion Engine and in which a solid-lubricant-feeding equipment is equipped on the lubricating-oil duct where the lubricating-oil has been finely cleaned and has not got to the friction parts, which is wholly sealed and is filled with solid lubricant, on which there are several holes evenly arranged; when the lubricating-oil flows over the outside surface of said solid-lubricant-feeding equipment and said holes, because the static pressure of the flowing liquid is lower, the solid lubricant in the solid-lubricant-feeding equipment is drawn out through said holes and mixes with the lubricating-oil. This friction-reducing lubricating-oil equipment doesn't need any other driving equipment and can transfer the solid lubricant to the friction parts without filtering out by the filter, and therefore is not only simple in structure, but also very effective in friction-reducing.

8 Claims, 5 Drawing Sheets

FRICTION-REDUCING LUBRICATING-OIL FILTER FOR INTERNAL COMBUSTION ENGINE

INTRODUCTION

The friction-reducing lubricating-oil filter for Internal Combustion Engine proposed by the present invention relates to a type of filtering equipment of the lubricating-oil, which is particularly used for the lubricating-oil filter when some solid lubricant is added to the lubricating-oil of Internal Combustion Engine.

THE BACKGROUND OF THE INVENTION

So far, the lubricating-oil filters for Internal Combustion Engines used all over the world aren't equipped with the equipment for providing solid lubricant automatically. The method that the lubricating-oil of Internal Combustion Engine is previously added to with solid lubricant and then is for using is widely used in some developed countries. By using this method, when the lubricating-oil is filtered by the lubricating-oil filter and the solid lubricant deposits in the lubricating-oil, and therefore there is only a minority of the solid lubricant to gets to the friction parts. Even though the disperser is added to reduce the deposit of the solid lubricant, it is unavoidable that the solid lubricant is filtered out by the filter before getting to the friction parts. Another method is that a supplementary equipment is used to force the solid lubricant to enter the lubricating-oil duct of Internal Combustion Engine while Internal Combustion Engine is working and make the solid lubricant mix with the lubricating-oil. Generally, this type of equipment is driven independently and the solid lubricant is forced to enter the lubricating-oil duct between the filter and the friction parts. Although this method can overcome the disadvantage that the solid lubricant may be filtered out by the lubricating-oil filter and therefore cannot wholly get to the friction parts, the supplementary equipment makes the whole structure of Internal Combustion Engine complicated, the cost and the consumption of energy increase and its reliability may decrease due to its complicated structure.

So the present invention proposes a friction-reducing lubricating-oil filter for Internal Combustion Engine, in which only a simple solid-lubricant-feeding equipment is equipped on the lubricating-oil duct in the finer lubricating-oil filter where the lubricating-oil has been finely cleaned, and the solid lubricant is drawn into the lubricating-oil duct and then is carried to the friction parts by the lubricating-oil by means of the flow of the lubricating-oil. By using this method to add solid lubricant to the lubricating-oil, the equipment not only is simple in structure, but also only depends on the flow of the lubricating-oil to make the solid lubricant mix with the lubricating-oil automatically, and can make the majority of the solid lubricant get to the friction surface, and make the solid lubricant more effective. The diameters of the articles of the solid lubricant can be under 5 um and is about ten times as big as that of the solid lubricant which is now widely used. The use of the solid lubricant with big articles not only can improve the lubricating effectiveness, but also can decrease the manufacturing cost of the solid lubricant and therefore the economical effectiveness is noteworthy.

The purpose of the friction-reducing lubricating-oil filter for Internal Combustion Engine proposed by the present invention is to solve the problem that the lubricating-oil filter cannot feed solid lubricant automatically, and make the majority of the solid lubricant get to the friction parts to reduce the wear of the friction parts and decrease the consumption of energy, and also avoid the loss of the solid lubricant. In said friction-reducing lubricating-oil filter for Internal Combustion Engine, a supplementary equipment is equipped on the lubricating-oil duct where the lubricating-oil has been finely cleaned and has not got to the friction parts to make the solid lubricant enter the lubricating-oil duct and mix with the lubricating-oil automatically.

SUMMARY OF THE INVENTION

The present invention proposes a friction-reducing lubricating-oil filter for Internal Combustion Engine, wherein, a solid-lubricant-feeding equipment is equipped on the lubricating-oil duct where the lubricating-oil has been finely cleaned and has not got to the friction parts, which is wholly sealed, in which the solid lubricant is filled and on which there are several holes. When the lubricating-oil flows over the outside surface of said solid-lubricant-feeding equipment and said holes, because the static pressure of the flowing liquid is lower, the solid lubricant in the solid-lubricant-feeding equipment is drawn out through said holes and mixes with the lubricating-oil and then is carried to the friction parts.

DETAILED DESCRIPTION OF THE INVENTION

The present invention proposes a friction-reducing lubricating-oil filter for Internal Combustion Engine, wherein, a solid-lubricant-feeding equipment is equipped on the lubricating-oil duct in the finer filter where the lubricating-oil has been finely cleaned and has not got to the friction parts, which is equipped in the bore of the filter element concentrically and can be integrally replaced, and which is composed of two sleeves which are putted around together. The solid lubricant is filled in the ring space formed between the interior surface of the outer sleeve and the exterior surface of the inner sleeve. The upper end and the lower end of said ring space are sealed by two end plates. Several holes with a diameter of 12-500 um are evenly arranged on the lower end plate. The diameters of said holes can be 0.1-5 mm In the case of big holes, a mesh covers on each hole and is fixed on the surface of the lower end plate inside the ring space, which density is about 60-400 mesh, i.e. 60-400 holes per square inch. A semicircular duct under the lower end plate covers on each hole and is fixed on the surface of the lower end plate outside of the ring space. Said semicircular ducts are communicated with the lower sleeve which is connected with the lower end of the inner sleeve and extends through the lower end plate, and a circular lower plate is fixed and used to cover and seal the lower end of said lower sleeve. The lubricating-oil which has been finely cleaned flows into the semicircular ducts, passes through the center of the inner sleeve and finely flows to the friction parts. When the lubricating-oil flows through the semicircular duct, because the static pressure of the flowing liquid is lower, the solid lubricant in the ring space is drawn into the flowing lubricating-oil through the holes on the lower end plate and mixes with the lubricating-oil and then is carried to the friction parts.

A powder baffle may be fixed on the interior surface of the outer sleeve and over the holes on the lower end plate, which extends toward the center of the sleeves and basically parallels the lower end plate.

Several holes can be arranged on the upper side of the outer sleeve to make some lubricating-oil enter the ring space to fill the vacuum formed in the ring space with the solid lubricant flowing out.

PREFERRED EMBODIMENTS

Some preferred embodiments are hereinafter detailed by referring to the drawings.

Figure 1:
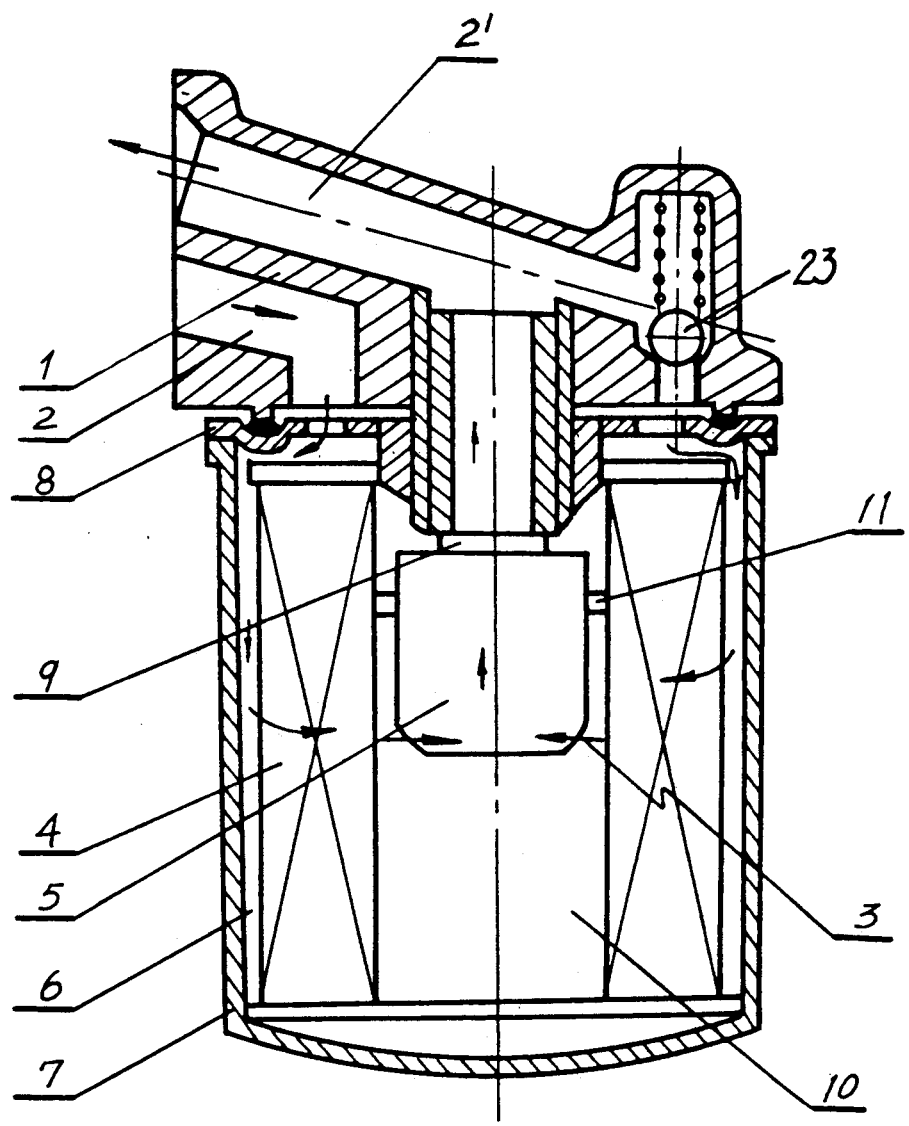
FIG. 1 is a sectional view of the first embodiment of the friction-reducing lubricating-oil filter for Internal Combustion Engine proposed by the present invention, wherein, 5 is the solid-lubricant-feeding equipment.
Figure 2:
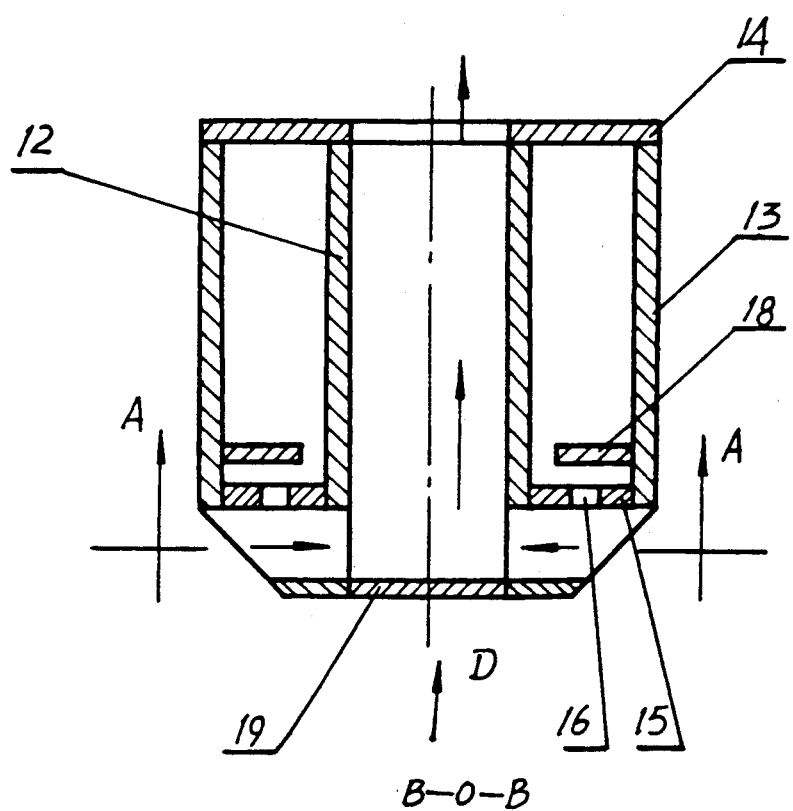
FIG. 2 is a rotated vertical sectional view of the solid-lubricant-feeding equipment.
Figure 3:
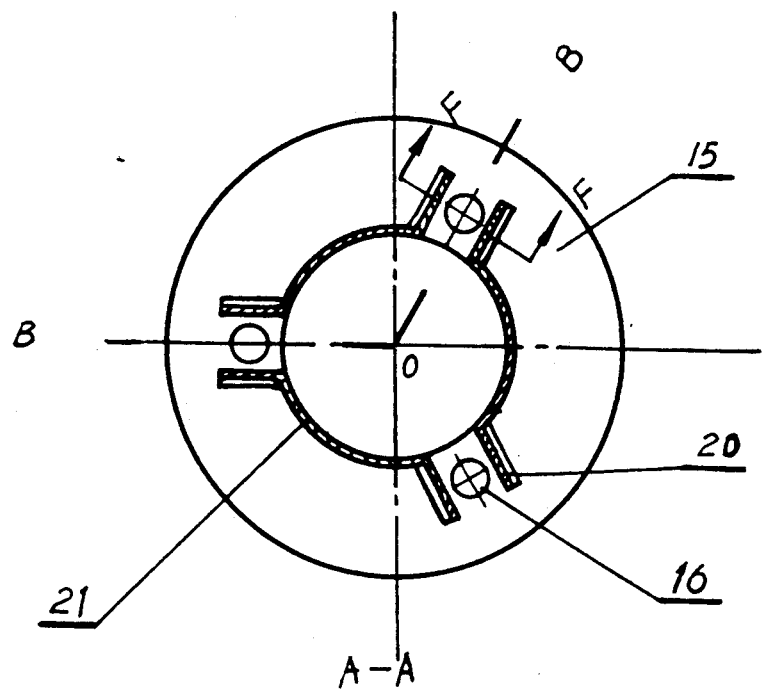
FIG. 3 is a A—A sectional view on FIG. 2.
Figure 4:
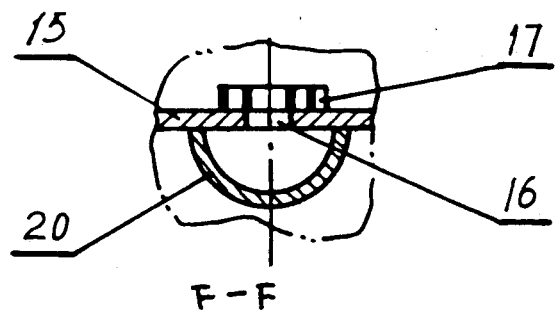
FIG. 4 is a F—F sectional view on FIG. 3.
Figure 5:
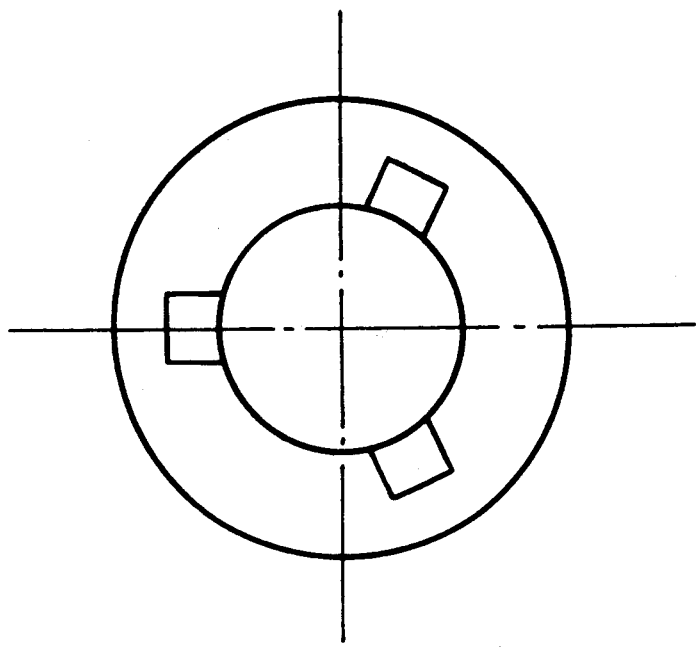
FIG. 5 is a D-directional view on FIG. 2.

The first embodiment is hereinafter detailed:

Referring to FIG. 1, FIG. 2 and FIG. 5, 1 is the filter base of the rotatablely-equipped friction-reducing lubricating-oil filter; 2 and 2' are the oil inlet duct and the oil outlet duct; 7 is the outer casing; 8 is a base plate 23 is the oil by-pass valve opening into the oil outlet duct 2'; 4 is the filter element; in the central space 10 of the said filter element; a solid-lubricant-feeding equipment 5 is clipped by the fixing element 11, which inner sleeve is communicated with the oil outlet duct, and which is made up with an inner sleeve 12 and an outer sleeve 13. A ring space is formed by the exterior surface of the inner sleeve and the interior surface of the outer sleeve, two ends of which are sealed by an upper end plate 14 and a lower end plate 15, and in which the powder of the solid lubricant is filled. Several mini-holes 16 are evenly arranged on the lower end plate 15, the diameters of which are about 12–500 um. There are preferably three to ten mini-holes 16, three in the embodiment of FIGS. 1–4. A powder baffle 18 is fixed on the interior surface of the outer sleeve 13 and over said mini-holes, which extends toward the center of the sleeves and basically parallels the lower end plate and which width is slightly greater than the diameter of said mini-hole. A semicircular duct 20 covers on and communicates with each mini-hole and is fixed on the surface of the lower end plate outside the ring space while a copper mesh 17 covers mini-holes 16 on the inner surface of the lower end plate inside the ring space (as shown on FIG. 3 and FIG. 4); each semicircular duct 20 is communicated with another lower sleeve 21 which is connected and communicated with the lower end of the inner sleeve and extends through the lower end plate 15; the lower end of the said lower sleeve 21 is covered and sealed by a circular lower plate 19.

The lubricating-oil flows from the oil inlet duct 2 to the space 6 and then passes through the filter element 4 into the central space 10 of the said filter element 4. When the filtered lubricating-oil flows into the solid-lubricant-feeding equipment 5 through position 3 as shown on FIG. 1, passes through the semicircular duct 20 and enters the lower sleeve 21, and then flows through the inner sleeve 12, and drains from the oil outlet duct 2' of the filter, and finally gets to the friction parts.

Figure 6:
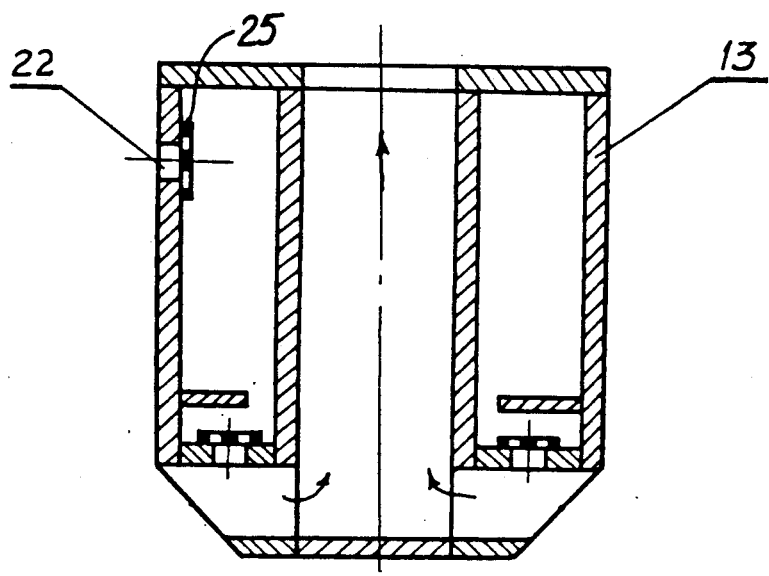
FIG. 6 is a rotated vertical sectional view of the solid-lubricant-feeding equipment in the second embodiment.

Referring to FIG. 6 for the second embodiment, its principle and structure are similar to those of the first embodiment. The difference is that a hole 22 is arranged on the upper side of the outer sleeve 13 to make some lubricating-oil enter the ring space to fill the vacuum formed in the ring space with an adhesive solid lubricant such as graphite in a homogenous suspension with a general lubricant, as well known in the art, flowing out (as shown on FIG. 6). The diameter of holes 16 and 22 are about 0.1–5 mm. A copper mesh 25 with a density of 60–400 mesh covers on said hole 22 and is fixed on the interior surface of the outer sleeve.

Figure 7:
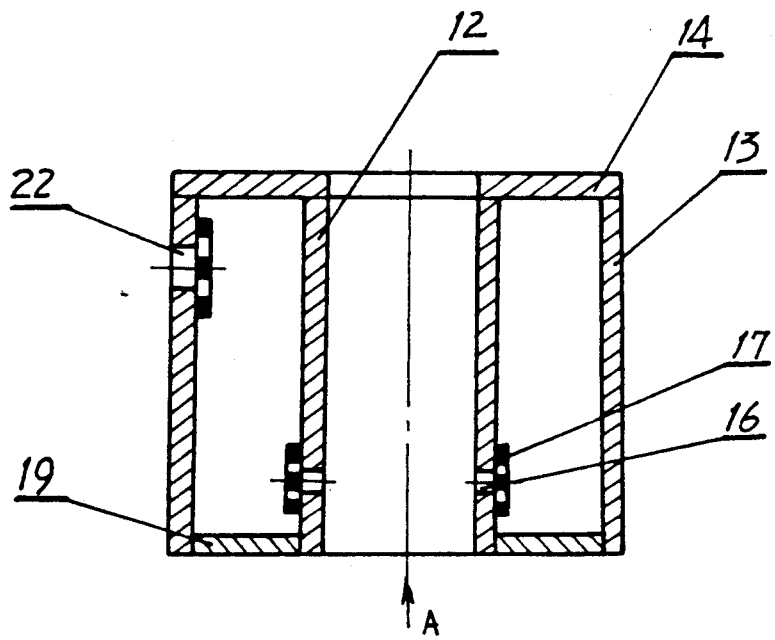
FIG. 7 is a rotated vertical sectional view of the solid-lubricant-feeding equipment in the third embodiment.
Figure 8:
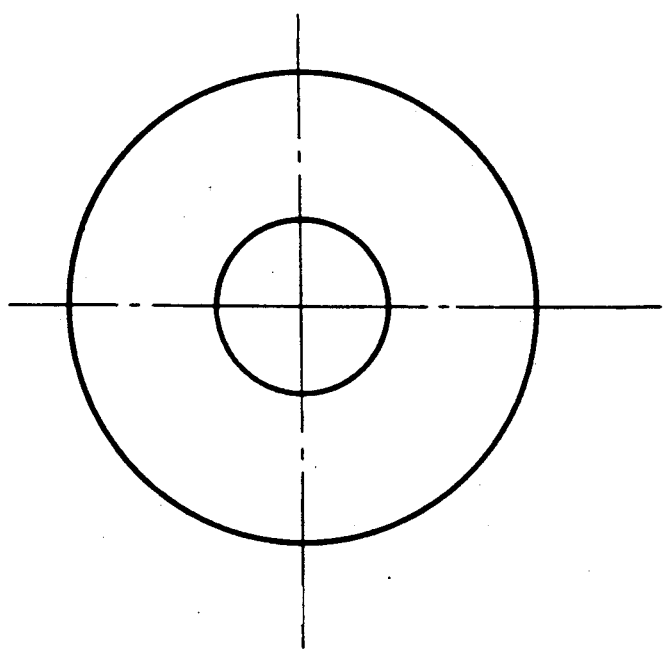
FIG. 8 is a A-directional view on FIG. 7.

Referring to FIG. 7 and FIG. 8 for the third embodiment, the placement and its procedure of the solid-lubricant-feeding equipment 5 in the third embodiment are similar to those of the first embodiment, wherein, the solid-lubricant-feeding equipment 5 is composed of an inner sleeve 12 and an outer sleeve 13. A ring space is formed by the exterior surface of the inner sleeve 12 and the interior surface of the outer sleeve 13, which is filled with adhesive solid lubricant, and the upper end and the lower end of which are sealed by the upper end plate 14 and the lower end plate 19. Four holes with a diameter of 0.1–5 mm are evenly arranged on the lower side of the inner sleeve 12, which are used to draw solid lubricant from the ring space. Another hole with a diameter of 0.1–5 mm is arranged on the upper side of the outer sleeve 13. All these holes are covered with copper mesh 17 with a density of 60–400 mesh inside the ring space. When the lubricating-oil flows over the interior surface of the inner sleeve 12 and the hole 16, because the static pressure of the flowing liquid is lower, the solid lubricant in the ring space is drawn out and mixes with the lubricating-oil and then is carried to the friction parts.

What is claimed is:

1. A friction-reducing lubricating-oil filter, for use with a solid lubricant, comprising:
   a housing having an oil inlet and an oil outlet and defining a housing interior and means for establishing an oil flow path between the oil inlet and oil outlet;
   a filter element mounted within the housing along the oil flow path;
   a solid-lubricant-feeding means arranged in the housing interior along the flow path between the filter element and the oil outlet including:
   two concentric sleeves and in which a ring space is formed by the exterior surface of the inner sleeve and the interior surface of the outer sleeve and is filled with the solid lubricant;
   upper and lower end plates used to cover and seal two ends of said ring space;
   several holes evenly arranged on the lower end plate;
   a semicircular duct fixed on the surface of the lower end plate outside the ring space, which covers on and is communicated with each said hole and is also communicated with another lower sleeve which is connected with the lower end of the inner sleeve and extends through the lower end plate;
   a circular lower plate used to cover and seal the lower end of said lower sleeve;

whereby when the filtered lubricating-oil flows into the solid-lubricant-feeding means, and passes through the semicircular duct and enters the lower sleeve, the solid lubricant in the sold-lubricant-feeding means is drawn out through said holes and mixes with the lubricating-oil because the static pressure of the flowing liquid is lower in the area adjacent said holes, the lubricating-oil with the solid lubricant then flows through the inner sleeve, and finally passes through the oil outlet of the filter.

2. A friction-reducing lubricating-oil filter as claimed in claim 1 and in which the diameters of the holes on said lower end plate are about 12 to 500 um and the number of the evenly arranged holes is about 3 to 10.

3. A friction-reducing lubricating-oil filter as claimed in claim 2 and in which a powder baffle is fixed on the interior surface of the outer sleeve and over the said holes on the lower end plate and extends toward the center of the sleeves and basically parallels the lower end plate.

4. A friction-reducing lubricating-oil filter as claimed in claim 1 and in which the diameters of the holes on said lower end plate are about 0.1 to 5 mm, and a copper mesh covers on the holes and is fixed on the surface of the lower end plate inside the ring space, which density is about 60 to 400 mesh, i.e. 60 to 400 holes per square inch.

5. A friction-reducing lubricating-oil filter as claimed in claim 4 and in which a hole with a diameter of 0.1 to 5 mm is arranged on the upper side of the outer sleeve, and a copper mesh with a density of 60 to 400 mesh covers on said hole and is fixed on the interior surface of the outer sleeve.

6. A friction-reducing lubricating-oil filter, for use with a flowable adhesive solid lubricant, comprising:
 a housing having an oil inlet and an oil outlet and defining a housing interior and means for establishing an oil flow path between the oil inlet and oil outlet;
 a filter element mounted within the housing along the oil flow path;
 a solid-lubricant-feeding means arranged in the housing interior along the flow path between the filter element and the oil outlet including:
  two concentric sleeves and in which a ring space is formed by the exterior surface of the inner sleeve and the interior surface of the outer sleeve and is filled with the solid lubricant;
  two end plates used to cover and seal two ends of said ring space;
  several holes evenly arranged on a lower side of the inner sleeve, which is used to draw the solid lubricant from the ring space;
  another hole arranged on an upper side of the outer sleeve, which is used to make some lubricating-oil enter the ring space to fill the vacuum formed in the ring space with the adhesive solid lubricant flowing out, and a copper mesh fixed on the interior surface of the outer sleeve and used to cover said another hole.

7. A friction-reducing lubricating oil filter as claimed in claim 6 and in which the density of said mesh is about 60 to 400 mesh; the diameters of the holes on the lower side of the inner sleeve are about 0.1 to 5 mm and the diameter of the hole on the upper side of the outer sleeve is also about 0.1 to 5 mm.

8. A friction-reducing lubricating-oil filter as claimed in claim 6, further comprising a by-pass valve coupling the housing interior and the oil outlet.

* * * * *